United States Patent [19]

Jay

[11] Patent Number: 4,633,773
[45] Date of Patent: Jan. 6, 1987

[54] HOLDER FOR ROASTING POULTRY

[75] Inventor: Murray Jay, Woodsburgh, N.Y.

[73] Assignee: Gemco Ware, Inc., Freeport, N.Y.

[21] Appl. No.: 811,297

[22] Filed: Dec. 20, 1985

[51] Int. Cl.⁴ .............................................. A47J 43/18
[52] U.S. Cl. ....................................... 99/426; 99/446; 211/181; D7/409
[58] Field of Search .................. 99/426, 446; D7/409; D6/566; 211/181

[56] References Cited

U.S. PATENT DOCUMENTS

| D. 253,156 | 10/1979 | Bengloff | 99/426 X |
| D. 270,608 | 9/1983 | Spanek | D7/409 |
| 3,392,665 | 7/1968 | Harnest | 99/426 |
| 4,027,583 | 6/1977 | Spanek | 99/421 H |
| 4,450,759 | 5/1984 | Steibel | 99/426 X |
| 4,557,188 | 12/1985 | Spanek | 99/426 X |

Primary Examiner—Billy J. Wilhite
Attorney, Agent, or Firm—Lilling & Greenspan

[57] ABSTRACT

A holder for roasting poultry comprises a detachable drip pan and a first bent wire element interlocking with a second bent wire element whose ends are attached to the circumference of the drip pan and curve inwardly and upwardly to a vertical plane relative to the drip pan. The first wire element being longer than the second wire element has a sine-like top curve having a low point which is crossed by the apex of the second bent wire element.

6 Claims, 5 Drawing Figures

FIG.1
PRIOR ART
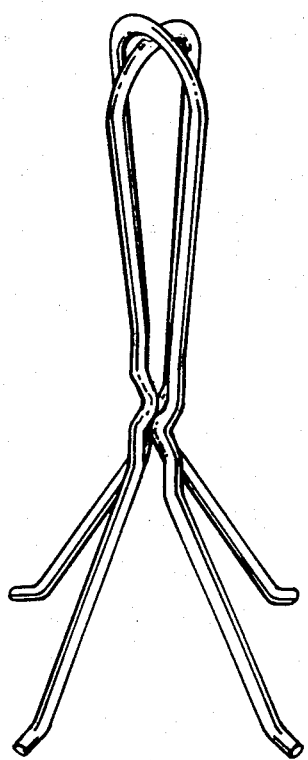
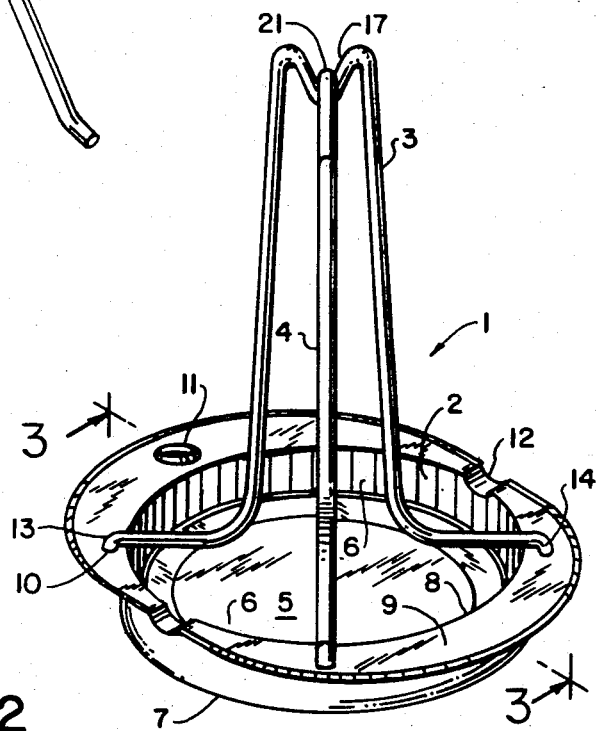
FIG.2

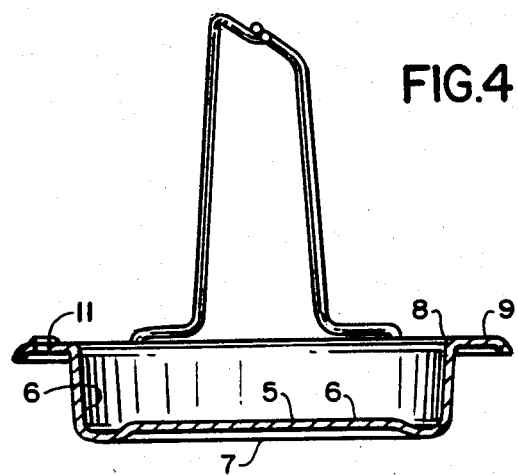
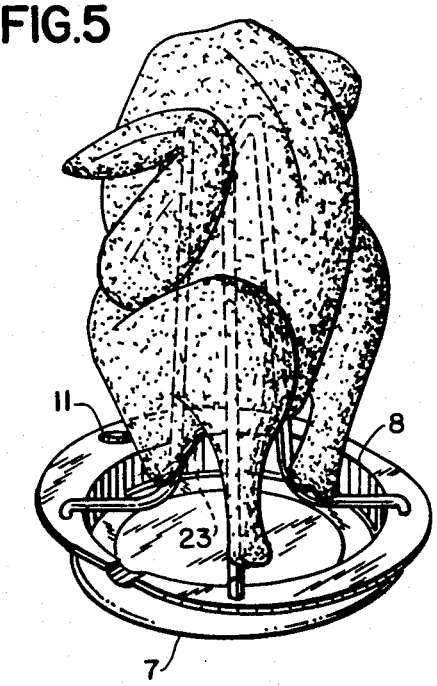
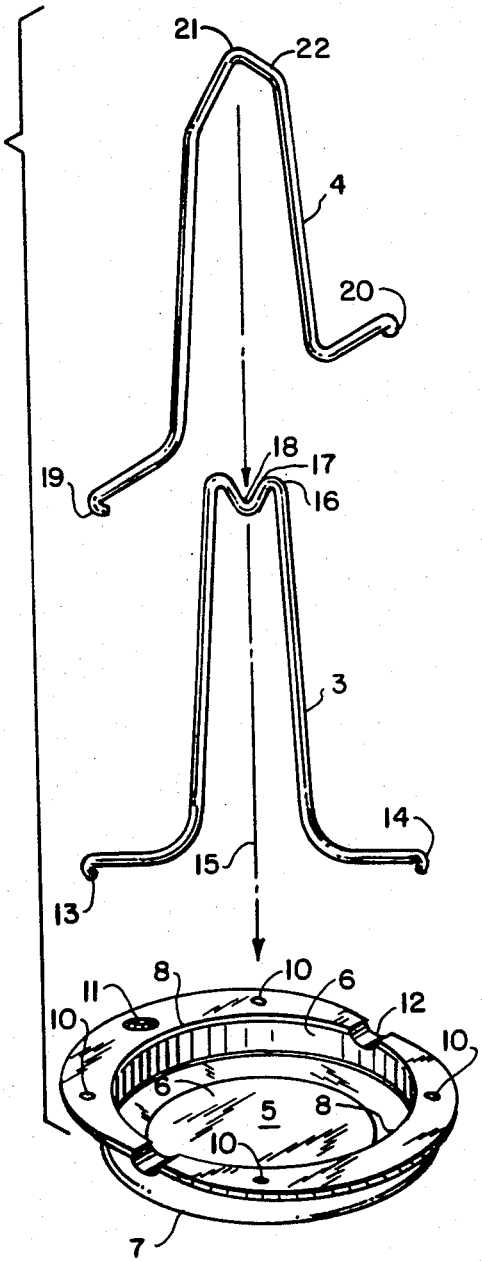

4,633,773

HOLDER FOR ROASTING POULTRY

FIELD OF THE INVENTION

The invention pertains to an improved holder for roasting poultry in a conventional oven having interlocking bent wire elements curved over a drip pan. The bent wire elements are inserted into a cavity of the poultry to be roasted and fat, grease and water drain into the drip pan during the cooking process.

BACKGROUND OF THE INVENTION

Holders for roasting meat in conventional ovens are well known in the art. In particular, as illustrated in FIG. 1, a rack consisting of two intertwined bent wire elements resembling an egg beater has been marketed under the trademark "POUL TREE" owned by Boval Products, Corp. of Newton Highlands, Mass., U.S. Trademark Registration No. 1,098,180.

The vertical portions of the curved wires are inserted into the opening of a bird's cavity and the rack is then placed inside a typical roasting pan and inserted into the oven. The present invention is an improvement over the prior art poultry rack in that it includes a detachable drip pan coated with a non-stick material for easy cleaning. Accordingly, the holder is self-contained without the need of an additional cooking pan. Further, the interlocking top curves of the wire elements of the subject invention provide rigidity for the holder assembly and at the same time allow for ease of separation for easy cleanup.

Thus, an object of the invention is to provide an easy to clean poultry holder whose self-contained design eliminates the need for additional cooking pans. Further, poultry roasted on the improved holder is crisp, yet moist, as the heat from the oven is evenly distributed both inside and outside of the meat and pools of liquid such as melted fat, grease or thawed ice do not form in the meat but are drained into the detachable drip pan.

SUMMARY OF THE INVENTION

The inventive device comprises a detachable drip pan and two bent wire elements which interlock with each other at top curves. The bent wire elements are attached to the circumference of the drip pan and bend inwardly from the circumference and then upwardly to a vertical plane relative to the drip pan. The interlocking wire elements are easily separable for ease of cleaning.

BRIEF DESCRIPTION OF THE DRAWINGS

FIG. 1 is an illustration of a prior art roasting rack.
FIG. 2 is a perspective view of the inventive poultry roasting holder.
FIG. 3 is a cross-sectional view taken along lines 3—3 of FIG. 2
FIG. 4 is an exploded view of the poultry holder.
FIG. 5 is a perspective view of the poultry holder in use.

DETAILED DESCRIPTION OF THE INVENTION

The inventive roasting holder 1 is comprised of a detachable drip pan 2 and two interlocking bent wire elements 3,4. As illustrated in FIG. 2, the drip pan 2 and the wire elements 3, 4 are preferably constructed of a metal material such as aluminum or steel, however, it may be appreciated that any suitable material known in the art may be used.

Further, to provide for ease of cleaning, an inside surface 5 of the drip pan 2 is coated with a non-sticking material coating 6, as illustrated in FIG. 3. In another embodiment, the entire drip pan 2, including its bottom surface 7 may be coated with such a nonsticking material to ensure ease of cleaning of all parts of the drip pan 2, however, it is most cost efficient and practical to coat only the inside surface 5 of the drip pan 2 with the nonsticking material coating. In the preferred embodiment, the nonsticking material coating used is marketed under either the trademark TEFLON or SILVERSTONE owned by E. I. Du Pont De Nemours & Company.

Around a circumference 8 of the drip pan 2, the drip pan 2 is curved outwardly to form a peripheral edge 9. In a preferred embodiment four holes 10 are equally spaced along the peripheral edge 9 of the drip pan 2, resulting in any pair of the four holes 10 being diametrically opposed to each other as illustrated in FIG. 4. A fifth hole 11 may also be provided in the peripheral edge 9 and used as a hanging hole for storing the poultry rack 1. Further, a depression 12 may also be provided in the peripheral edge 9 for holding a basting utensil, such as a brush, as illustrated in FIGS. 2 and 4.

In the preferred embodiment, a first wire element 3 has two ends 13, 14 which are bent downwardly in a vertical plane and inserted into two of the four holes 10 in the drip pan peripheral edge 9 to removably attach the wire elements 3, 4 to the peripheral edge 9 of the drip pan 2. It is pointed out, however, that the ends 13, 14 may be attached to the drip pan by any means known in the art. Extending from the ends 13,14 toward a vertical axis 15 of the drip pan 2, the first wire element 3 first curves substantially horizontal toward the vertical axis 15 of the drip pan 2 and then curves upwardly in a substantially vertical plane relative to the vertical axis of the drip pan 2. At a top end 16 of the first wire element 3, the wire 3 bends inwardly again to form a sine-like curve 17 at the top of the wire 3. The lowest point 18 of the sine curve 17 should be approximately in line with the vertical axis 15 of the drip pan, which corresponds to the central axis of the first wire element.

A second wire element 4 also has two ends 19, 20 which are bent downwardly in the same manner as the ends 13, 14 of the first wire element 3 and are inserted into two of the holes 10 in the drip pan 2. Extending from the ends 19, 20, the second wire element first curves inwardly toward a vertical axis 15 of the drip pan 2 and then curves upwardly in a substantially vertical plane relative to the vertical axis of the drip pan 2, and then curves inwardly toward a vertical axis 15 of the drip pan to come to a apex point 21 at the top of the curve 22 of the second wire element 4. When assembled, the apex 21 of the curve 22 crosses the lowest point 18 of the sine-like curve 17 of the first wire element 3 to interlock the two wire elements 3, 4 and provide rigidity for the poultry holder 1, as shown in FIG. 2.

The above discussed bending of the wire elements 3, 4 is preferred because the resulting vertical portions of the wire elements 3, 4 are positioned in close proximity to each other as, illustrated in FIG. 2, for ease in inserting the wire elements 3, 4 into a poultry cavity and at the same time resulting in rigidity of the assembly. The preferred bending embodiment of the first curve of the wire elements 3, 4 further ensures that the dripping fluids will travel straight down from the roasting poultry and into the drip pan 2, minimizing splashing of the dripping fluids into the oven. It may be appreciated, however, that the wire elements 3, 4 may be bent in any manner in the first curve from the ends 13, 14 or 19, 20 toward the vertical axis 15 of the drip pan 2, which is known in the art and does not create a barrier to inserting the holder 1 into a cavity of the poultry to be roasted. Further, although a vertical portion of the wire elements 3, 4 relative to the vertical axis 15 of the drip pan 2 is preferred, any curving of the wire elements 3, 4 which accomplishes the purpose of roasting poultry in a substantially vertical position is acceptable.

For ease of cleaning, one separates the wire elements 3, 4 from the drip pan 2 by first removing the ends 19, 20 of the second wire element 4 from the holes 10 in the peripheral edge 9 of the drip pan 2. Then one lifts the apex 21 of the wire element 4 out of the sine-like curve 17 of the first wire element 3. Subsequently, one removes the ends 13, 14 of the wire element 3 from the holes 10 in the peripheral edge 9. Once disassembled, the holder 1 may be easily cleaned. To reassemble the holder 1, one reverses the above-described procedure.

The assembled holder 1 is used for roasting poultry, such as chicken, by inserting the top curves 17, 22 of the wire elements 3, 4 into an opening 23 of the chicken's cavity and inserting the wire elements 3, 4 as far as they will go into the chicken's cavity. Thus, positioned the poultry is ready to be inserted into an oven for roasting as illustrated in FIG. 5.

I claim:

1. A holder for roasting poultry comprising:
   (a) a detachable drip pan;
   (b) a first bent wire element having means at opposite ends for releasable attachment to a circumference of said drip pan, said first bent wire element first curving inwardly in a substantially horizontal plane relative to a vertical axis of said drip pan, then curving in a substantially vertical plane relative to said vertical axis, and then curving toward said vertical axis of said drip pan and forming a sine-like top curve with a low point of said curve located at a vertical axis of said first bent wire element; and
   (c) a second bent wire element of a shorter length than the length of said first bent wire element, said second bent wire element having means at opposite ends for releasable attachment to said circumference of said drip pan and first curving inwardly in a second substantially horizontal plane relative to said vertical axis of said drip pan, then curving in a substantially vertical plane relative to said vertical axis and then curving toward said vertical axis of said drip pan and forming an apex point, and interlocking said second bent wire element with said first bent wire element at said apex point of said second bent wire element and said low point of said sine-like top curve.

2. A holder for roasting poultry according to claim 1, wherein said means at opposite ends of said first bent wire element and said second bent wire element comprised flexible wire ends curving downwardly in a substantially vertical plane relative to said vertical axis of said drip pan and said means are removably inserted into at least four holes in a peripheral edge around said circumference of said drip pan.

3. A holder for roasting poultry according to claim 2, wherein a pair of said four holes are diametrically opposed on said peripheral edge around said circumference of said drip pan.

4. A holder for roasting poultry according to claim 1, wherein said drip pan has an inside surface coated with a nonsticking material coating.

5. A holder for roasting poultry according to claim 1, wherein said drip pan is made of aluminum.

6. A holder for roasting poultry according to claim 1, wherein said first and second bent wire elements are made of aluminum.

* * * * *